(12) United States Patent
Biondi et al.

(10) Patent No.: US 7,374,392 B2
(45) Date of Patent: May 20, 2008

(54) METHOD AND DEVICE FOR FORMING A STACK OF PACKETS

(75) Inventors: Andrea Biondi, Bologna (IT); Ivanoe Bertuzzi, Casalecchio di Reno (IT); Maurizio Ventura, Crespellano (IT); Mirco Legnani, Bologna (IT); Simone Scagliarini, San Giovanni in Persiceto (IT)

(73) Assignee: G.D Societa' Per Azioni, Bologna (IT)

( * ) Notice: Subject to any disclaimer, the term of this patent is extended or adjusted under 35 U.S.C. 154(b) by 270 days.

(21) Appl. No.: 11/062,312

(22) Filed: Feb. 18, 2005

(65) Prior Publication Data

US 2005/0204708 A1    Sep. 22, 2005

(30) Foreign Application Priority Data

Feb. 27, 2004  (IT) .......................... BO2004A0118

(51) Int. Cl.
*B65G 57/30*  (2006.01)
*B65G 33/02*  (2006.01)
*B65G 15/00*  (2006.01)

(52) U.S. Cl. ............................... 414/795.1; 198/467.1; 198/626.1; 414/795

(58) Field of Classification Search ............ 414/790.3, 414/795.3, 795, 795.1; 53/495, 447, 496; 198/406, 467.1, 417, 724, 778, 626.1
See application file for complete search history.

(56) References Cited

U.S. PATENT DOCUMENTS 4,361,082 A * 11/1982 Haas et al. ................. 99/450.4
5,823,738 A * 10/1998 Spatafora et al. ......... 414/795.1
6,050,060 A *  4/2000 Spatafora et al. ............. 53/447

FOREIGN PATENT DOCUMENTS

EP     0 814 038     12/1997
EP     0 860 384      8/1998
EP     0 962 390     12/1999

* cited by examiner

*Primary Examiner*—Saul J. Rodriguez
*Assistant Examiner*—Gregory W Adams
(74) *Attorney, Agent, or Firm*—Ladas and Parry LLP

(57) ABSTRACT

A method and device for forming a stack of n packets, whereby the packets, fed successively in a substantially horizontal direction to an input of a substantially vertical conveyor channel, are stacked by being lifted, along the conveyor channel, by an n-start screw push device rotating about an axis substantially parallel to the conveyor channel; the stack so formed is extracted from an output of the conveyor channel, in a radial output direction with respect to the axis of the screw push device, by a comb extractor movable along an annular path extending through the conveyor channel.

14 Claims, 5 Drawing Sheets

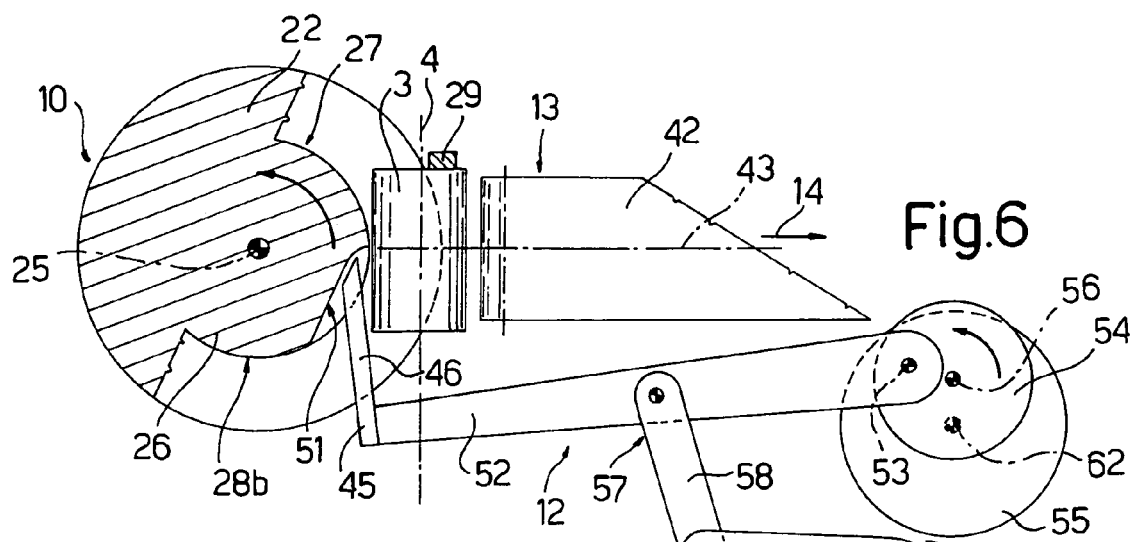
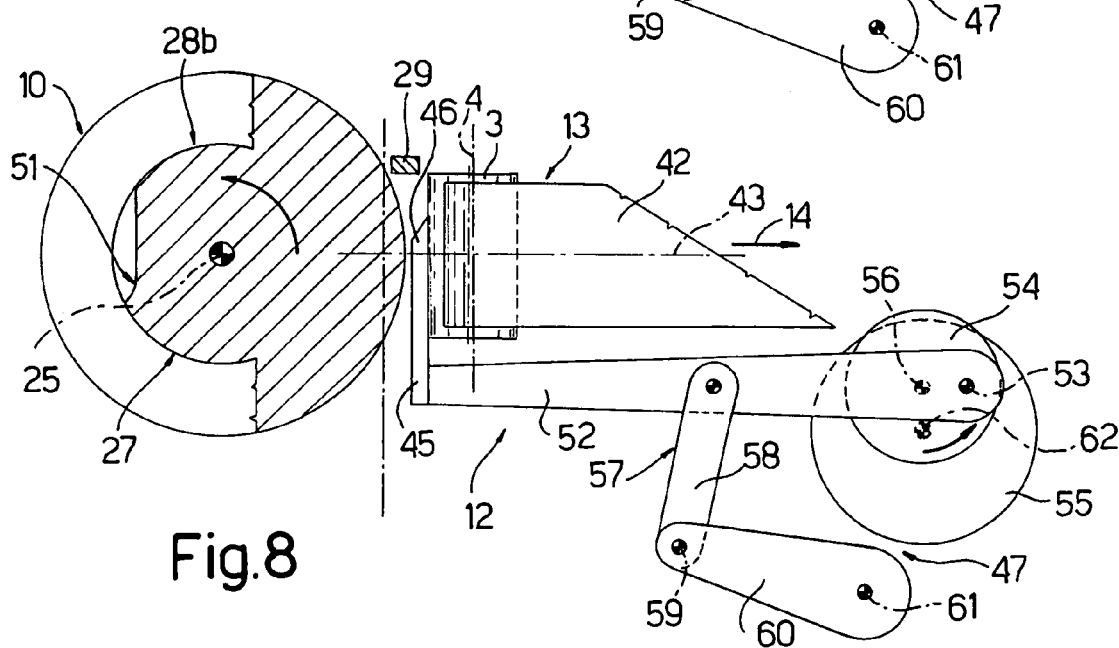

METHOD AND DEVICE FOR FORMING A STACK OF PACKETS

The present invention relates to a method and device for forming a stack of packets.

More specifically, the present invention relates to a method and device for forming a stack of packets, whereby the packets to be stacked are fed successively in a first direction to an input of a conveyor channel comprising said input and an output, and extending in a second direction substantially crosswise to the first direction, and are stacked by transferring the packets along the conveyor channel in the second direction to said output by means of a screw push device comprising an n-start screw mounted to rotate about an axis substantially crosswise to the first direction, and in turn comprising a core coaxial with said axis, and n helical channels, each for receiving a relative packet and extending about the core and through the conveyor channel; the stack being transferred at said output to an output conveyor by means of extracting means independent of the screw push device; and the output conveyor extending from the output of the conveyor channel in a third direction crosswise to the axis of the screw.

BACKGROUND OF THE INVENTION

Normally, the formed stack is removed from the screw push device using an output conveyor tangent to the core of the screw push device; and the stack, formed as described above, is transferred from the screw push device to the output conveyor by extracting means comprising pushers moving back and forth through the conveyor channel and aligned with the output conveyor.

The above method involves several drawbacks, on account of the pushers having to perform a forward and return movement through the conveyor channel without interfering with the packets in the next stack moving up along the conveyor channel.

Moreover, in known methods and structures of the type described above, the output conveyor is always positioned tangent to the core of the screw push device, thus invariably resulting in a relatively bulky structure.

SUMMARY OF THE INVENTION

It is an object of the present invention to provide a method of forming a stack of packets, designed to eliminate the aforementioned drawbacks.

According to the present invention, there is provided a method of forming a stack of packets, as claimed in the attached claims.

According to the present invention, there is also provided a device for forming a stack of packets, as claimed in the attached claims.

BRIEF DESCRIPTION OF THE DRAWINGS

A non-limiting embodiment of the present invention will be described by way of example with reference to the accompanying drawings, in which:

FIGS. 6 to 8 are similar to FIG. 5, and show the FIG. 5 detail in two different operating positions.

DETAILED DESCRIPTION OF THE INVENTION

Figure 1:
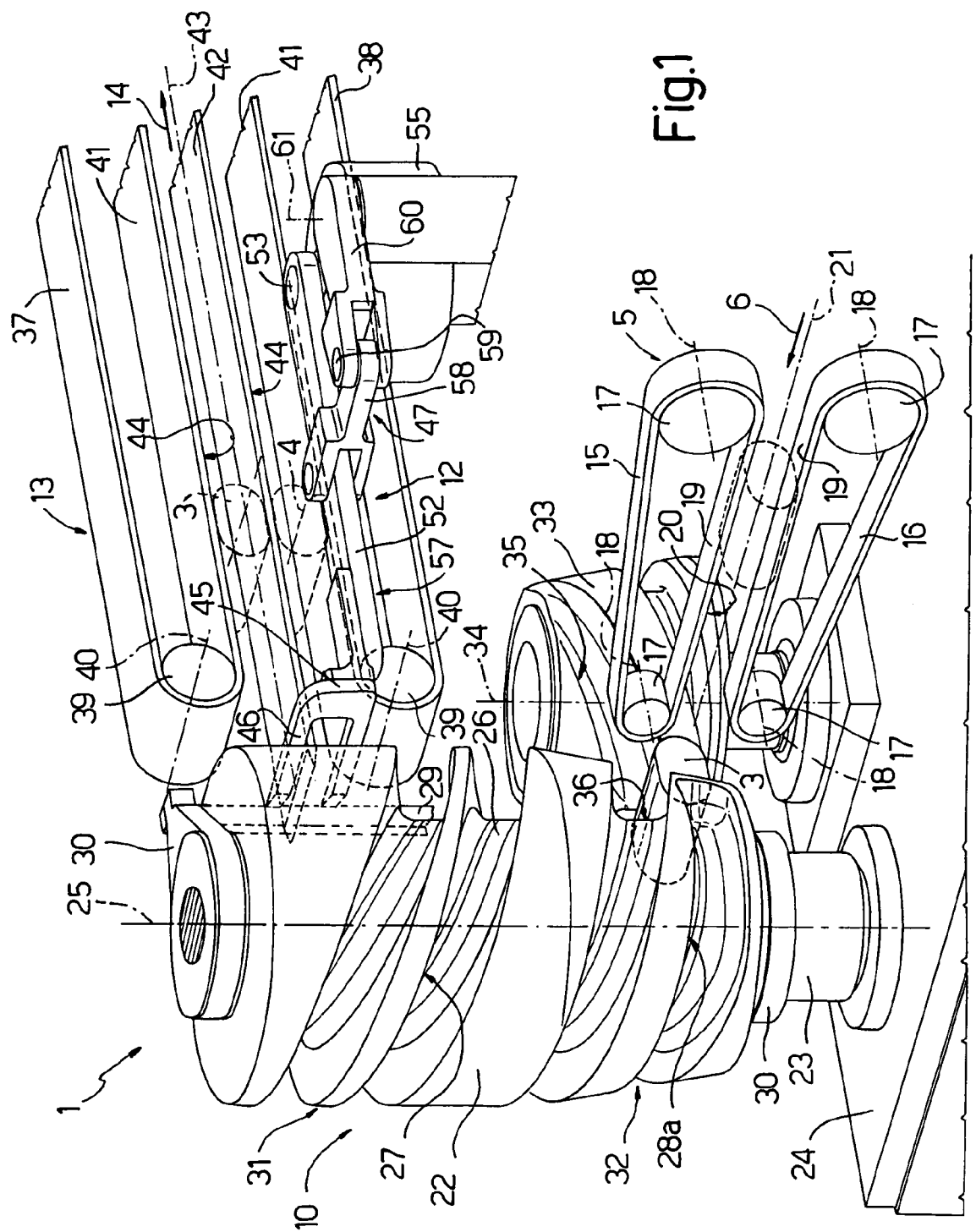
FIG. 1 shows a view in perspective of a preferred embodiment of the device according to the present invention.
Figure 2:
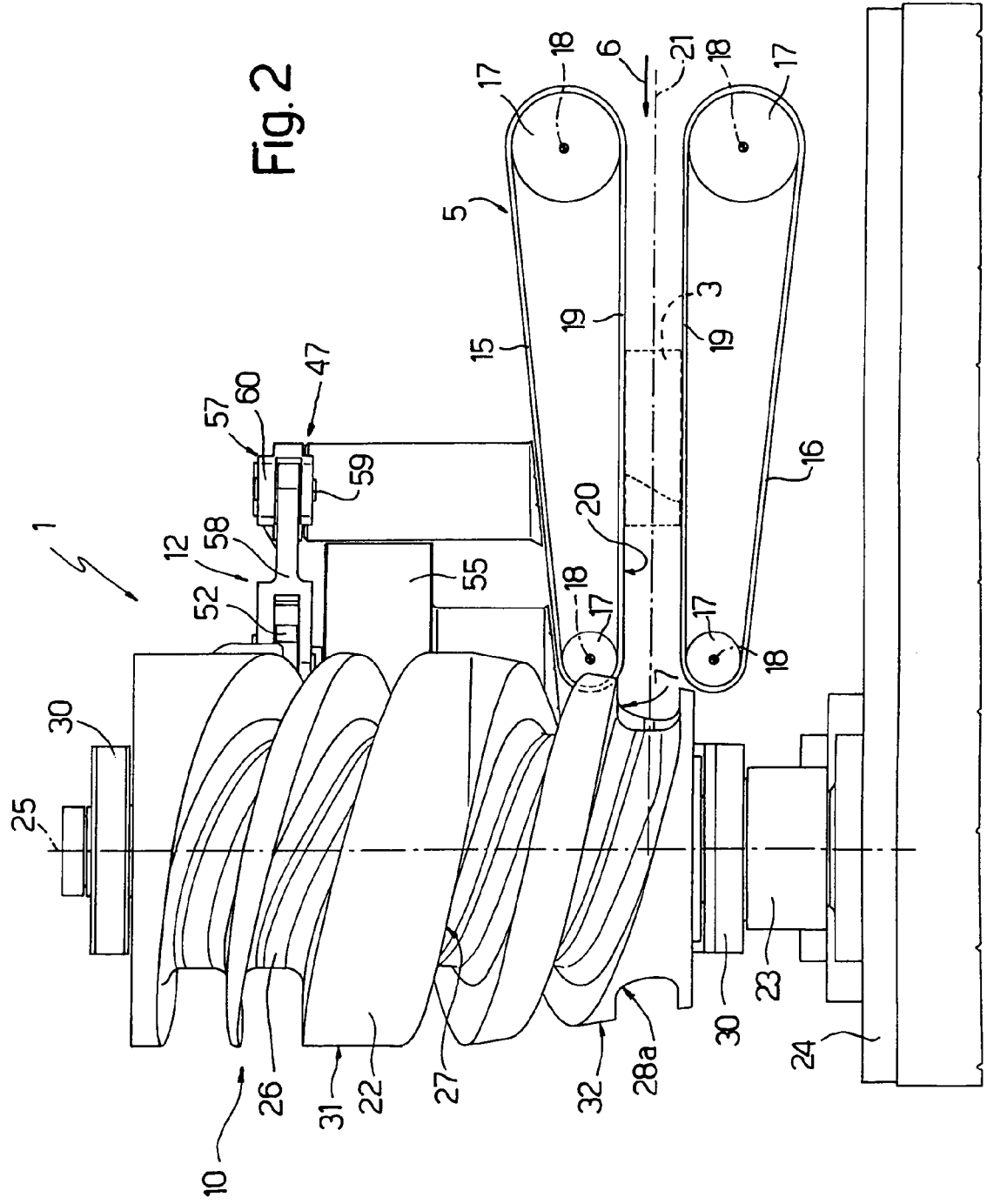
FIGS. 2 and 3 show two different side views of the FIG. 1 device.

Number 1 in FIG. 1 indicates as a whole a device for forming a stack 2 of n packets 3 of cigarettes (in the example shown, n equals two, but may be more than two), each of which has a longitudinal axis 4, and a cross section which, in the example shown, is substantially oval, but which may be any shape, e.g. rectangular with or without bevelled and/or rounded edges.

Device 1 comprises a feed conveyor 5 for successively feeding packets 3 axially, i.e. parallel to their longitudinal axes 4, and in a substantially horizontal feed direction 6 to an input 7 of a conveyor channel 8 (FIG. 3) extending in a conveying direction 9 (FIG. 3) which, in the example shown, is a substantially vertical direction crosswise to feed direction 6. Device 1 also comprises a push device 10 for feeding packets 3, crosswise to their longitudinal axes 4, along conveyor channel 8 and in conveying direction 9 from input 7 to an output 11, while forming, along conveyor channel 8, a succession of stacks 2, each of which is transferred, crosswise to longitudinal axes 4 of relative packets 3 and by means of an extracting device 12, from output 11 to an output conveyor 13 located at a different level—higher up, in the example shown—with respect to feed conveyor 5, and which feeds stacks 2 in an output direction 14 which, in the example shown, is crosswise to feed direction 6.

Feed conveyor 5 comprises two belts 15 and 16, which are looped about respective pairs of pulleys 17 rotating about respective axes 18 crosswise to feed direction 6, and have respective conveying branches 19 facing each other and movable in feed direction 6 to define a channel 20 extending along an axis 21 parallel to feed direction 6, and for receiving a succession of packets 3 positioned with their longitudinal axes 4 coaxial with axis 21.

Push device 10 comprises a tubular, n-start screw 22, which is fitted to a drive shaft 23 in turn fitted to a frame 24 and having an axis 25 (in the example shown, a vertical axis 25) substantially crosswise to feed direction 6. Screw 22 comprises a core 26 coaxial with drive shaft 23; and n variable-pitch, helical channels 27, each of which is of a height approximately equal to but no less than the thickness of a packet 3, and of a depth at most equal to the width of a packet 3, so that, when a packet 3 is positioned inside a respective helical channel 27, with respective longitudinal axis 4 tangent to an axis of helical channel 27, a portion of each axial end of packet 3 projects at all times outwards of helical channel 27.

Each helical channel 27 comprises an input portion 28a and an output portion 28b extending in respective planes substantially perpendicular to axis 25. Input portion 28a is on a level with feed conveyor 5, and has an axis tangent to axis 21 of channel 20, and output portion 28b is on a level with output conveyor 13, so that the pitch of each helical channel 27 varies between a value of substantially zero at portions 28a and 28b, and a maximum value at an intermediate portion of helical channel 27.

Push device 10 also comprises a fixed retaining bar 29 substantially tangent to the periphery of screw 22 and extending the full length of screw 22 in conveying direction 9; at least a portion of retaining bar 29 extending outside input portions 28*a* of helical channels 27 is positioned facing the output of channel 20; and retaining bar 29 is supported at the ends by respective fixed brackets 30, and cooperates with the leading end of each packet 3 fed to screw 22 to define a side of conveyor channel 8.

In the example shown, core 26 of screw 22 is of constant diameter, and screw 22 itself comprises a substantially cylindrical top portion 31, and a downward-tapering, truncated-cone-shaped bottom portion 32, so that each helical channel 27 comprises an output portion extending along top portion 31 and of constant depth substantially equal to the width of each packet 3, and an input portion extending along bottom portion 32 and varying in depth between a maximum substantially equal to the width of a packet 3, and a minimum, at input 7, substantially equal to half the width of a packet 3.

To prevent packets 3, which, in the example shown, are substantially oval-section packets, from being positioned inside respective helical channels 27 otherwise than as shown in the attached drawings, screw 22 cooperates with a further n-start screw 33 which rotates about a respective axis 34, parallel to axis 25, at the same angular speed as but in the opposite direction to screw 22. Screw 33 is truncated-cone-shaped, tapering upwards, is of substantially the same length as bottom portion 32 of screw 22, and is tangent to bottom portion 32. More specifically, axes 34 and 25 define a plane perpendicular to axis 21, and screw 33 comprises n helical channels 35 varying in pitch in the same way as helical channels 27 along bottom portion 32 of screw 22. Each helical channel 35 rotates in time with a respective helical channel 27 to define, along input portion 28*a* of respective helical channel 27, a seat 36 which is bounded by retaining bar 29 on the opposite side to that facing channel 20, has a cross section of substantially the same shape and approximately the same size as, but no smaller than, that of packets 3, and, as screws 22 and 33 rotate, moves up along conveyor channel 8 from a bottom start position in which seat 36 is coaxial with axis 21 and coincides with input 7.

In connection with the above, it should be pointed out that screw 22 in the example shown, i.e. having a tapering bottom portion 32 cooperating with a screw 33, is used solely to better stabilize the oval-section packets 3 entering conveyor channel 8, and that, in examples not shown, screw 22 is cylindrical, and screw 33 is either eliminated or, depending on the depth of helical channels 27, is maintained and of a length slightly less than that of screw 22.

Output conveyor 13 extends in output direction 14 from output 11 of conveyor channel 8, and comprises two belts 37 and 38 looped about respective pairs of pulleys 39 (only one of each pair shown) rotating about respective axes 40 crosswise to output direction 14. Belts 37 and 38 have respective conveying branches 41 moving in output direction 14 and facing each other with the interposition of a fixed partition 42, which has an axis 43 parallel to output direction 14 and perpendicular to axis 25, and defines, together with conveying branches 41, two channels 44, each for receiving a respective succession of packets 3, which are each positioned with respective longitudinal axis 4 crosswise to axis 43, and are each aligned vertically with a respective packet 3 in the other channel 44 to form a respective stack 2.

It should be pointed out that channels 44 are two in number because the example shown relates to the formation of stacks 2 defined by respective pairs of superimposed packets 3. To form stacks 2 of n packets, where n>2, both helical channels 27 and channels 44 are of n in number.

Figure 5:
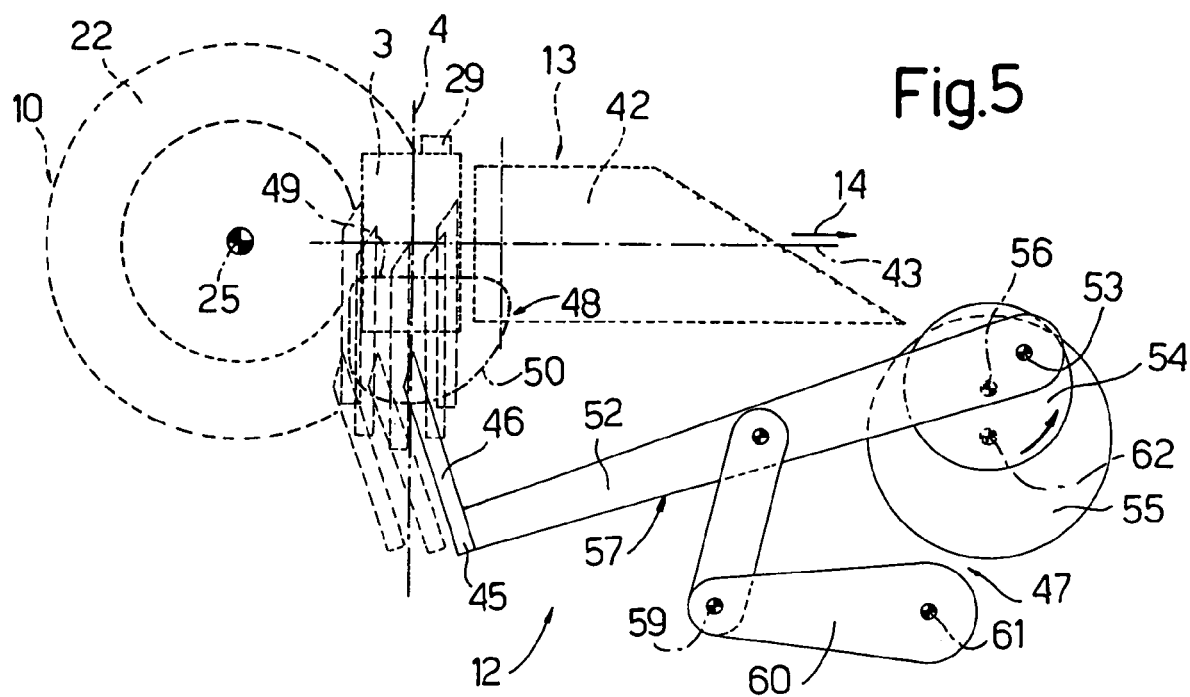
FIG. 5 shows a larger-scale section, along line V-V in FIG. 3, of a detail of the FIG. 1 device in a sequence of operating positions.

As shown in FIG. 5, each packet 3 of each stack 2 is transferred from conveyor channel 8 to a respective channel 44 by means of extracting device 12, which comprises a comb 45 with n teeth 46 (in the example shown, two teeth 46), and an actuating device 47 for moving comb 45 along an annular path 48 comprising a work portion 49, which is substantially parallel to axis 43 and extends radially with respect to axis 25 and through conveyor channel 8 towards the inputs of channels 44, and a substantially U-shaped return portion 50 comprising an end branch connected to the inner end of work portion 49 and substantially tangent to core 26 in a direction crosswise to axis 43.

When comb 45 is positioned at the inner end of work portion 49, each tooth 46 is positioned substantially crosswise to axis 43 and facing the input of respective channel 44, and engages a relative groove 51 formed in core 26 and extending along part of output portion 28*b* of respective helical channel 27.

Actuating device 47 comprises a rod 52 fitted integrally at one end with comb 45, and hinged at the other end, by means of an eccentric pin 53, to a drum 54 powered to rotate, clockwise in FIG. 5 and on a support 55, about a respective axis 56 parallel to pin 53 and to axis 25. Rod 52 and drum 54 respectively define a connecting rod and crank of an articulated quadrilateral transmission 57, which also comprises a further crank 58 hinged at one end to an intermediate portion of rod 52, and at the other end to a pin 59 parallel to axis 25 and fitted to one end of a lever 60 powered by a known cam device (not shown) to oscillate about an axis 61 parallel to axis 25.

In the above example, axis 56 and support 55 are therefore fixed. In an alternative improved variation, however, enabling a path 48 of any shape, and in particular enabling translation of comb 45 along a perfectly straight work portion 49 parallel to axis 43, while maintaining comb 45 perpendicular to work portion 49, support 55 is defined by a powered drum rotating about a respective axis 62 parallel to and a given distance from axis 56.

Figure 4:
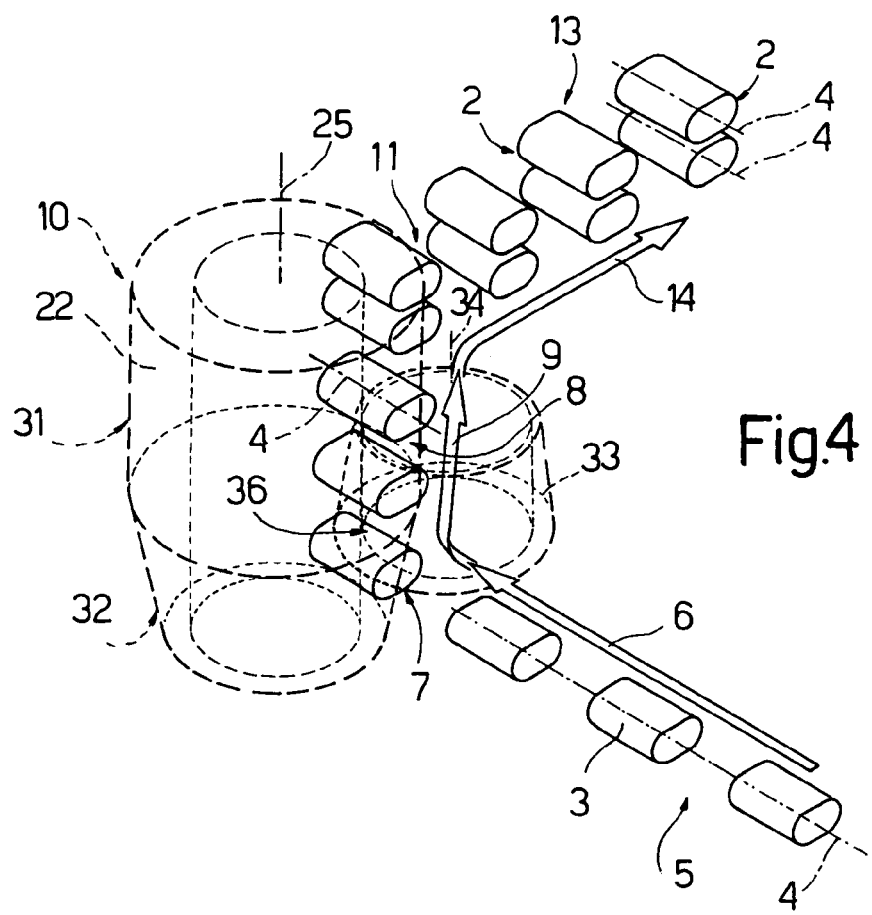
FIG. 4 shows an operating diagram in perspective of the FIG. 1 device.

In actual use, and with reference to FIGS. 1 and 4, each packet 3 fed by feed conveyor 5 to push device 10 reaches input 7 in time with a relative seat 36, engages seat 36 and is arrested against retaining bar 29, and is moved, together with relative seat 36 and crosswise to its longitudinal axis 4, along conveyor channel 8 to output 11. During the time it takes to move up along conveyor channel 8, each packet 3 is superimposed on all the other packets 3 occupying conveyor channel 8 at the same time.

Figure 3:
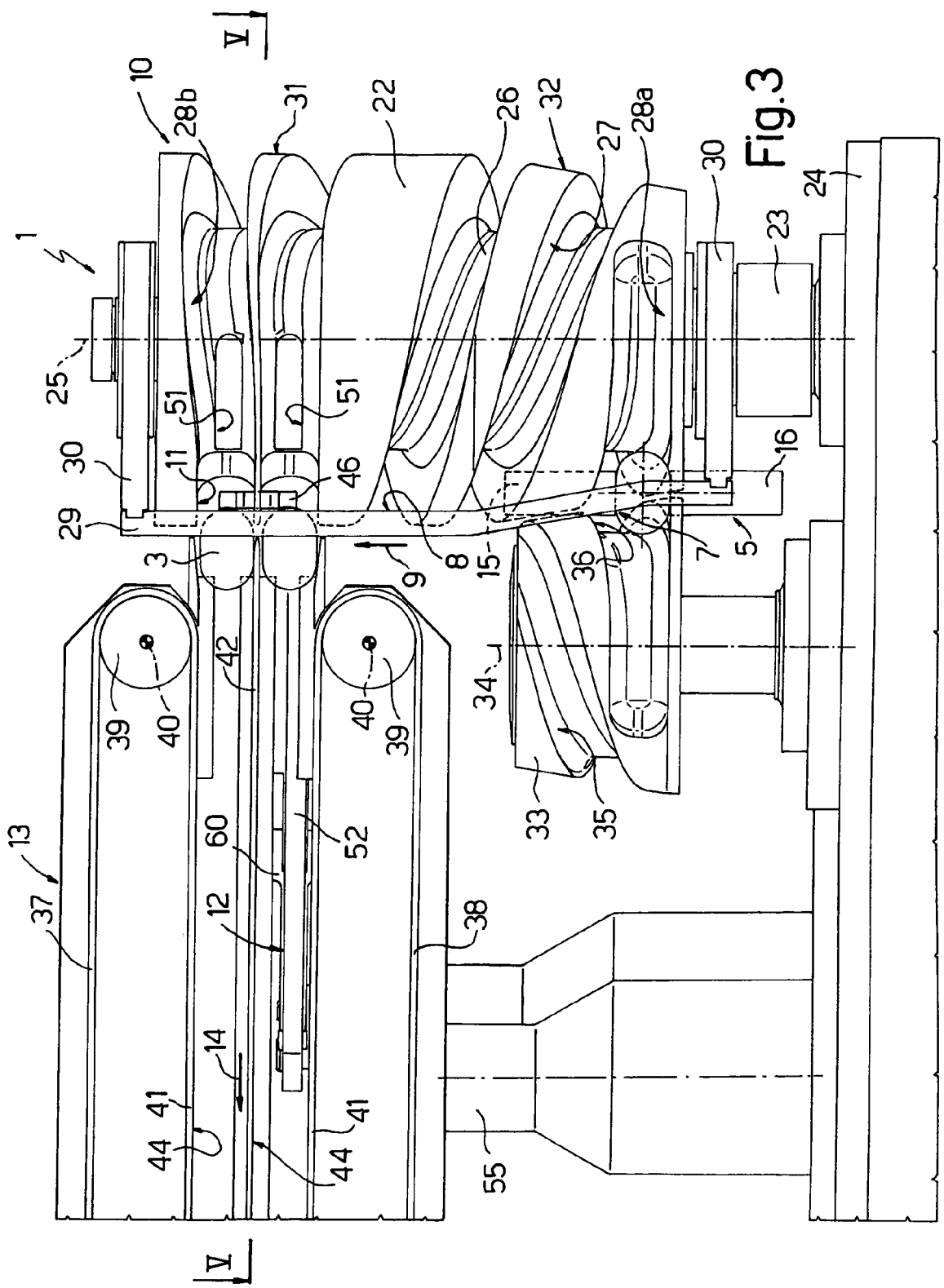

As shown more clearly in FIGS. 3 and 4, on reaching output 11 of conveyor channel 8, packets 3 are transferred in twos onto output conveyor 13 in output direction 14 and crosswise to their longitudinal axes 4 to form a succession of stacks 2 on output conveyor 13. To do this, as shown more clearly in FIGS. 5 to 8, as two packets 3 of the same stack 2 reach output 11, comb 45 is moved along the end branch of return portion 50 so that each of the two teeth 46 engages a respective groove 51 (FIG. 6) and contacts the lateral wall of a respective packet 3 (FIGS. 5 and 7). As teeth 46 are then moved along work portion 49 (FIGS. 5 and 8), the two packets 3 referred to are transferred simultaneously to respective channels 44 and fed in output direction 14, one over the other and separated by partition 42. Once packets 3 are released at the input of output conveyor 13, comb 45 is moved along return portion 50 back up to output 11 to extract the next pair of packets 3 from conveyor channel 8, and without interfering with the movement of the next pair of packets 3 along conveyor channel 8.

As shown in FIG. 4, by repeatedly transferring pairs of packets from screw 22 to output conveyor 13, a succession of stacks 2, equally spaced along axis 43, is formed on output conveyor 13.

The invention claimed is:

1. A device for forming a stack of n packets, the device (1) comprising
- a conveyor channel (8) having an input (7) and an output (11);
- feed means (5) for feeding said packets (3) successively to said input (7) in a first direction (6), the conveyor channel (8) extending in a second direction (9) substantially crosswise to said first direction (6);
- a screw push device (10) for moving said packets (3) along said conveyor channel (8) to said output (11), and in turn comprising at least one start screw (22), which has a first axis (25) substantially crosswise to said first direction (6), rotates about said first axis (25), and comprises a core (26) coaxial with said first axis (25), and n helical channels (27), each extending about said core (26) and through said conveyor channel (8);
- an output conveyor (13) extending from said output (11) in a third direction (14) crosswise to said first axis (25); and having a second axis (43) perpendicular to said first axis (25); the output conveyor (13) comprising a number of fixed partitions (42), which are parallel to the third direction (14) and define n channels (44), each for receiving a respective succession of packets (3), which are each aligned vertically with a respective packet (3) in the other channel (44) to form a respective stack (2); and
- extracting means (12) independent of said screw push device (10), movable along an annular path (48) comprising a work portion (49) and a return portion (50) different from the work portion (49), and for forming said stack (2) by transferring at the same time n packets (3) from top portions of n helical channels to the respective channels (44) of the output conveyor (13) at said output (11);
- wherein said work portion (49) extends in said third direction (14), through said conveyor channel (8) and top portions of all said n helical channels (27), from a first position tangent to said core (26), to a second position outside said screw push device (10) and said conveyor channel (8); and
- wherein said extracting means (12) comprise a comb (45) which, in said first position, is substantially tangent to said core (26) and crosswise to said third direction (14); said comb (45) comprising n teeth (46), each of which, in said first position, is located radially inside said conveyor channel (8) to engage a top portion of a respective said helical channel (27); and actuating means (47) being provided to move said comb (45) cyclically along said annular path (48) and through the top portion of the respective said helical channel (27) and said conveyor channel (8).

2. A device as claimed in claim 1, wherein said return portion (50) comprises an end portion to bring said extracting means (12) into said first position; said end portion being substantially crosswise to said third direction (14) and tangent to said core (26).

3. A device as claimed in claim 1, wherein said conveyor channel (8) is defined by a fixed retaining member (29) tangent to the screw push device (10) and extending in a direction parallel to said second direction (9).

4. A device as claimed in claim 1, wherein said actuating means (47) comprise a powered articulated quadrilateral transmission (57), in turn comprising a connecting rod (52) supporting said comb (45).

5. A device as claimed in claim 4, wherein said transmission (57) also comprises a first and second crank (54, 58) hinged to said connecting rod (52) and mounted to rotate respectively about a third (56) and fourth (59) axis parallel to said first axis (25).

6. A device as claimed in claim 5, wherein said first crank (54) is powered, and the relative said third axis (56) is fixed.

7. A device as claimed in claim 5, wherein said fourth axis (59) is an axis oscillating about a fixed fifth axis (61) parallel to said first axis (25).

8. A device as claimed in claim 1, wherein said core (26) comprises n grooves (51), each of which extends along a respective said helical channel (27), is movable through said conveyor channel (8) at said output (11), and receives a respective said tooth (46) when the tooth (46) is in said first position.

9. A device as claimed in claim 1, and also comprising a further screw push device (33), in turn comprising respective n helical channels (35), each of which corresponds with a respective helical channel (27) of the other screw push device (10); said screw push devices (10, 33) having respective parallel axes (25, 34) of rotation, being tangent to each other along said conveyor channel (8), and being mounted to rotate in opposite directions about the respective said axes (25, 34) of rotation.

10. A device as claimed in claim 9, wherein each said helical channel (27) and the relative corresponding helical channel (35) cooperate mutually at said conveyor channel (8) to define, between them and inside said conveyor channel (8), a seat (36) for housing a respective said packet (3).

11. A device as claimed in claim 10, wherein said seat (36) has a substantially oval section to house a respective substantially oval-section said packet (3).

12. A device as claimed in claim 9, wherein said conveyor channel (8) comprises an input portion (32) extending from said input (7), and an output portion (31) terminating at said output (11); said further screw push device (33) only being associated with said input portion (32).

13. A device as claimed in claim 12, wherein said helical channels (27) are of a first width along said input portion (32), and of a second width, greater than said first width, along said output portion (31).

14. A device as claimed in claim 1, wherein said first direction (6) and said third direction (14) are crosswise to each other.

* * * * *